US010421573B2

(12) United States Patent
Ribbe et al.

(10) Patent No.: US 10,421,573 B2
(45) Date of Patent: Sep. 24, 2019

(54) LINEN HAMPER

(71) Applicant: Geerpres, Inc., Muskegon, MI (US)

(72) Inventors: Scott E. Ribbe, West Olive, MI (US); Carleton Wright, Twin Lake, MI (US); Dale Bucy, Muskegon, MI (US)

(73) Assignee: Geerpres, Inc., Muskegon, MI (US)

( * ) Notice: Subject to any disclaimer, the term of this patent is extended or adjusted under 35 U.S.C. 154(b) by 0 days.

(21) Appl. No.: 15/716,429

(22) Filed: Sep. 26, 2017

(65) Prior Publication Data

US 2019/0092510 A1 Mar. 28, 2019

(51) Int. Cl.
*B65B 67/12* (2006.01)
*D06F 95/00* (2006.01)
*B62B 3/00* (2006.01)
*B65D 43/26* (2006.01)

(52) U.S. Cl.
CPC .......... *B65B 67/1211* (2013.01); *B62B 3/004* (2013.01); *B65B 67/1222* (2013.01); *B65B 67/1238* (2013.01); *D06F 95/004* (2013.01); *B62B 2202/66* (2013.01); *B62B 2301/04* (2013.01); *B65B 2067/1261* (2013.01)

(58) Field of Classification Search
CPC . B65B 67/1211; B65B 67/12; B65B 67/1266; B65B 67/1222; B65B 67/1238; B65F 1/163; B65F 1/1623; B65F 1/16; B65F 1/06; B65D 43/262; B65D 43/26; B62B 3/004; D06F 95/004; D06F 95/002
USPC ...... 220/264, 263, 262, 9.4, 495.08, 495.06, 220/908.1, 908; D34/9, 8, 7, 1
See application file for complete search history.

(56) References Cited

U.S. PATENT DOCUMENTS

| 1,446,346 | A | * | 2/1923 | Hanson | B65B 67/1222 248/97 |
| 2,644,737 | A | * | 7/1953 | Davis | B65F 1/08 312/270.3 |
| 5,213,228 | A | * | 5/1993 | Chang | B65F 1/06 220/495.08 |
| 5,582,471 | A | * | 12/1996 | Lin | A24F 19/0092 108/150 |
| 6,209,744 | B1 | | 4/2001 | Gill | |
| 6,857,538 | B2 | | 2/2005 | Lin | |
| 6,920,994 | B2 | | 7/2005 | Lin | |
| 9,725,227 | B2 | | 8/2017 | Chow | |

(Continued)

FOREIGN PATENT DOCUMENTS

| DE | 4132958 A1 | * | 5/1992 | ............... B65F 1/08 |
| GB | 419230 A | * | 11/1934 | ............... B65F 1/163 |
| GB | 2445534 A | * | 7/2008 | ............... B65F 1/163 |

*Primary Examiner* — Robert J Hicks
(74) *Attorney, Agent, or Firm* — Mitchell Intellectual Property Law, PLLC

(57) ABSTRACT

A linen hamper made of a light weight tubular frame for releasably securing a hamper bag includes an open top which can be closed by a pivotally mounted lid. The lid is connected to a foot pedal pivotally mounted on the frame, by an adjustable control rod pivotally connected to each. A closing cylinder is biased to close the lid when pressure is removed from the foot pedal. However, the control rod is adjustable to a second state in which the pivot point of its connection to the lid is aligned or is over center relative to the pivot point of the lid, and with respect to the closing force exerted by the control rod on the lid, such that the closing cylinder cannot close the lid until the lid is tapped forwardly slightly.

13 Claims, 6 Drawing Sheets

(56) References Cited

U.S. PATENT DOCUMENTS

| | | | |
|---|---|---|---|
| 2002/0092853 A1 | 7/2002 | Wang | |
| 2013/0105486 A1* | 5/2013 | Mashburn | B65F 1/06 |
| | | | 220/495.06 |
| 2018/0022545 A1* | 1/2018 | Chang | B65D 43/262 |
| | | | 220/262 |

* cited by examiner

LINEN HAMPER

FIELD AND BACKGROUND OF THE INVENTION

The present invention relates to the field of linen hampers. Such hampers often have a foot pedal which when pressed, lifts the lid on the hamper. When the users foot is removed, the lid closes, often with a bang. One company has a large solid walled, heavy clothes hamper which includes a damper cause the lid to close more slowly when the user's foot is removed.

SUMMARY OF THE INVENTION

The clothes hamper of the present invention comprises a lid connected to a foot pedal by at least one adjustable control rod. A cylinder closer is connected between the hamper and either the lid or the foot pedal, and in one control rod adjustment state, is biased to close the lid slowly and quietly when the foot pedal is released. However, the control rod can be adjusted such that when the foot pedal is fully depressed, the lid assumes an open position from which the cylinder will not close the lid when the foot pedal is released. The user taps the lid in a closing direction, and the cylinder will then slowly close the lid.

These and other objects, advantages and features of the invention will be more fully understood and appreciated by reference to the appended drawings and the Description of the Preferred Embodiments.

DESCRIPTION OF THE PREFERRED EMBODIMENTS

Figure 1:
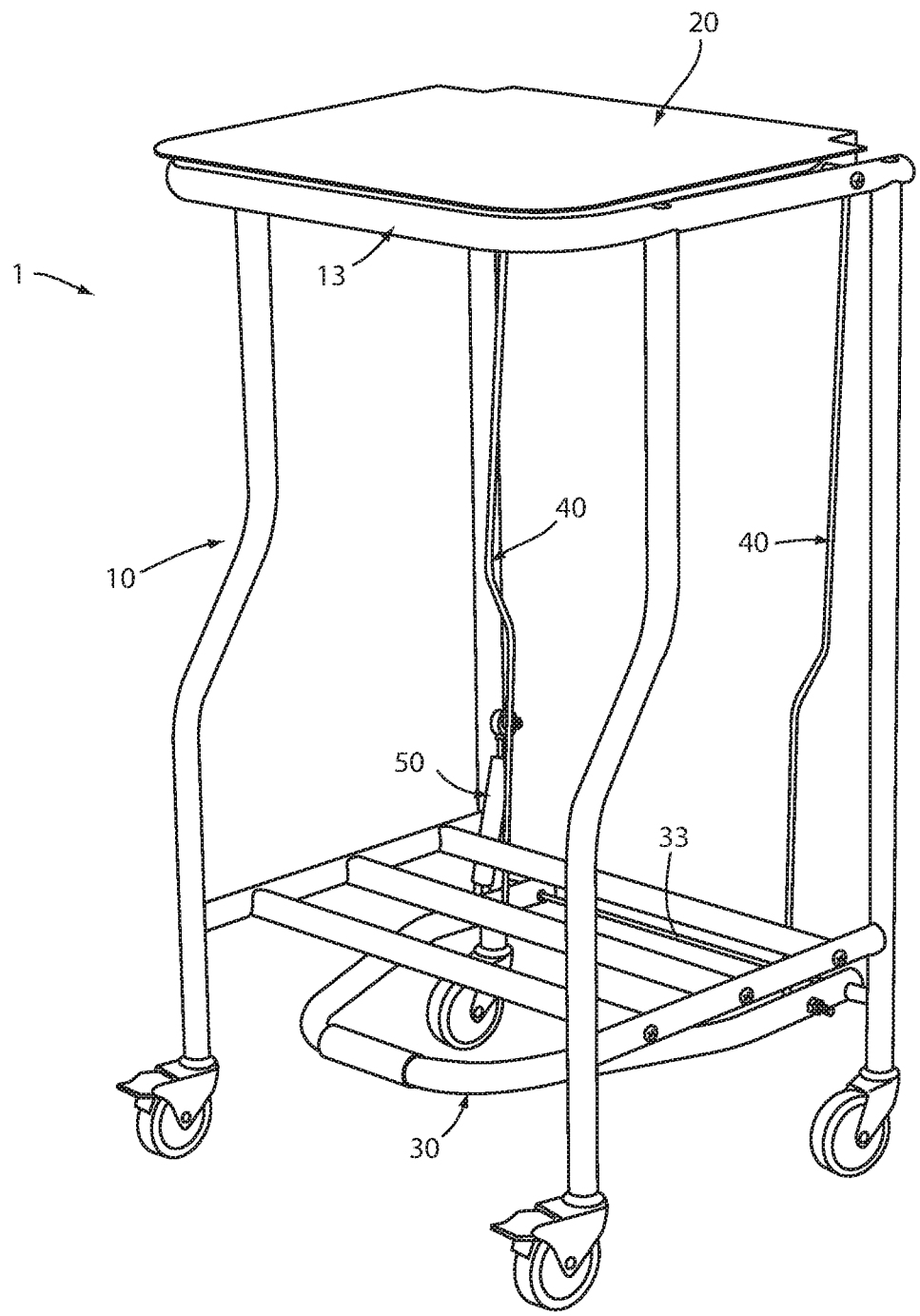
FIG. 1 is a perspective view of a preferred embodiment hamper frame with closed lid.
Figure 2:
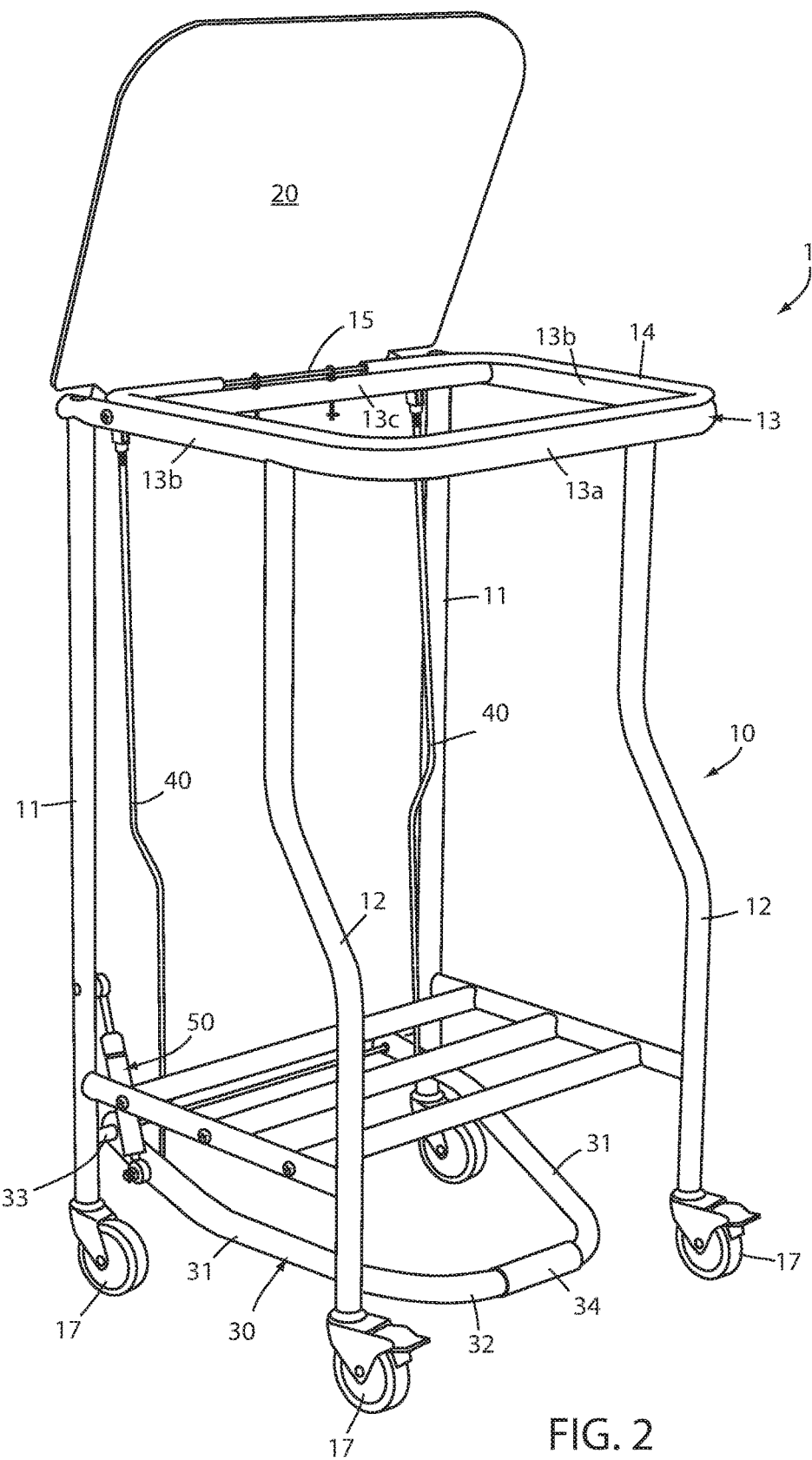
FIG. 2 is a perspective view of the preferred embodiment hamper frame with the lid open.
Figure 3:
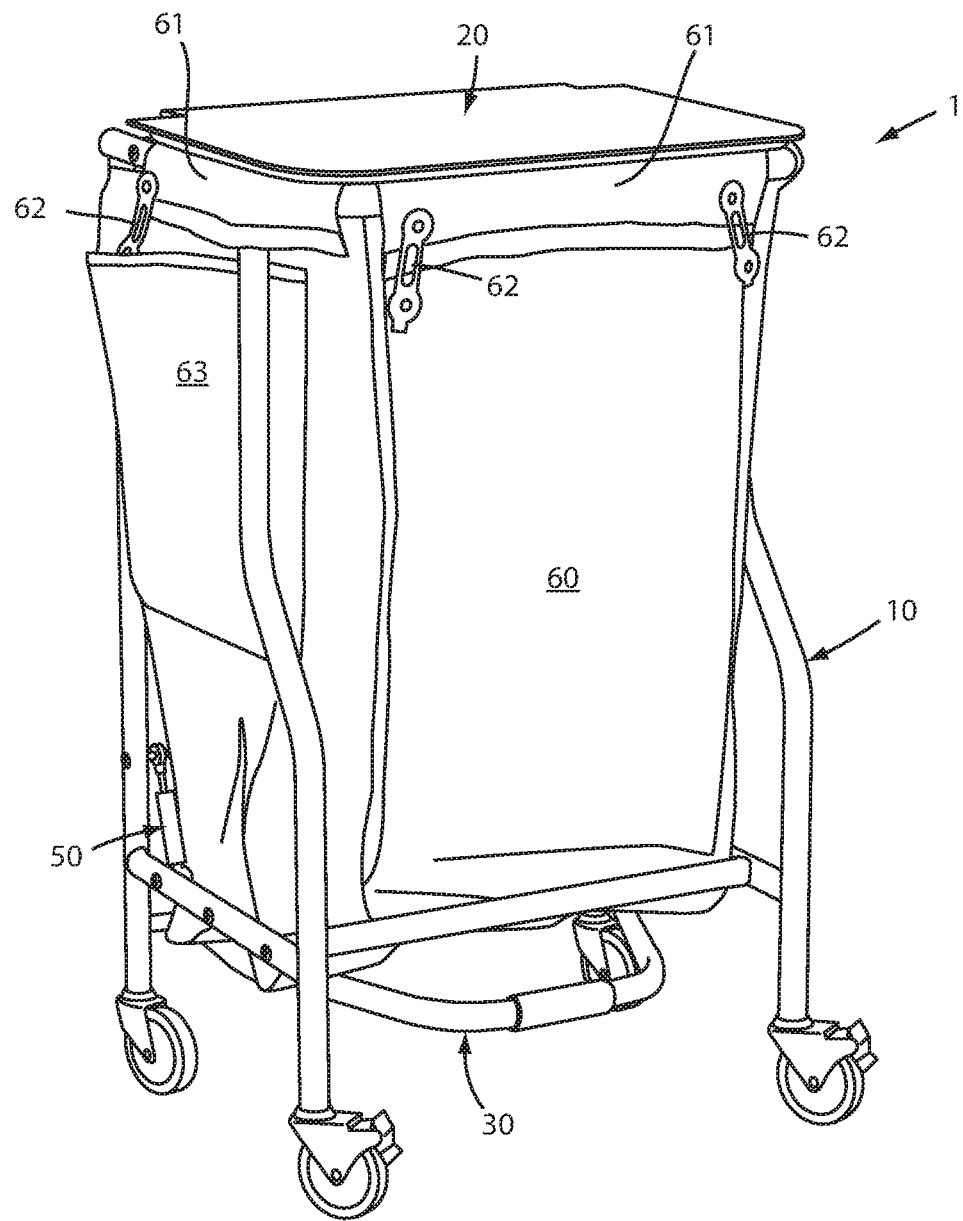
FIG. 3 is a perspective view of the preferred embodiment hamper with a hamper bag carried on the hamper frame.

The hamper 1 of the preferred embodiment comprises a frame 10, a lid 20, a foot pedal 30, control rods 40, a closing cylinder 50, and a hamper bag 60 which can be removably mounted on frame 10 (see FIGS. 1-3). Control rods 40 connect lid 20 to foot pedal 30 and are adjustable such that lid 20 can be opened to either the position shown in FIG. 7A, in which closing cylinder 50 causes lid 20 to close when pressure is removed from it and causes lid 20 to close. Alternatively, control rods 40 can be adjusted such that when foot pedal 30 is depressed, lid 20 is pushed into the position shown in FIG. 7B, such that closing cylinder 50 will not cause lid 20 to close when the user's foot is removed from foot pedal 30. A slight tap on lid 20 in the closure direction is required for the closing cylinder to then lift foot pedal 30 and cause lid 20 to close.

The various components of the preferred embodiment are set forth and numbered in the parts list below:

| | |
|---|---|
| Linen Hamper | 1 |
| Tubular frame | 10 |
| Rear legs | 11 |
| Front legs | 12 |
| Top opening frame | 13 |
| Hamper bag retainer frame | 14 |
| Retainer frame pivot axel | 15 |
| Bottom bag support frame | 16 |
| Casters | 17 |
| Hamper lid | 20 |
| Lid side flanges | 21 |
| Connector aperture | 21a |
| Lid pivot axel | 22 |
| Foot pedal frame | 30 |
| Side legs | 31 |
| Front cross leg | 32 |
| Pedal pivot axel | 33 |
| Cushion sleeve | 34 |
| Control rods | 40 |
| Threaded ends of rod | 40a |
| Threaded connector | 41 |
| Threaded sleeve | 41a |
| Legs | 41b |
| Connector pin | 42 |
| Connector pin latch | 43 |
| Leg | 43a |
| Clip | 43b |
| Closing cylinder | 50 |
| Hamper bag | 60 |
| Flaps | 61 |
| Securement tabs | 62 |
| Side pocket | 63 |

Figure 4:
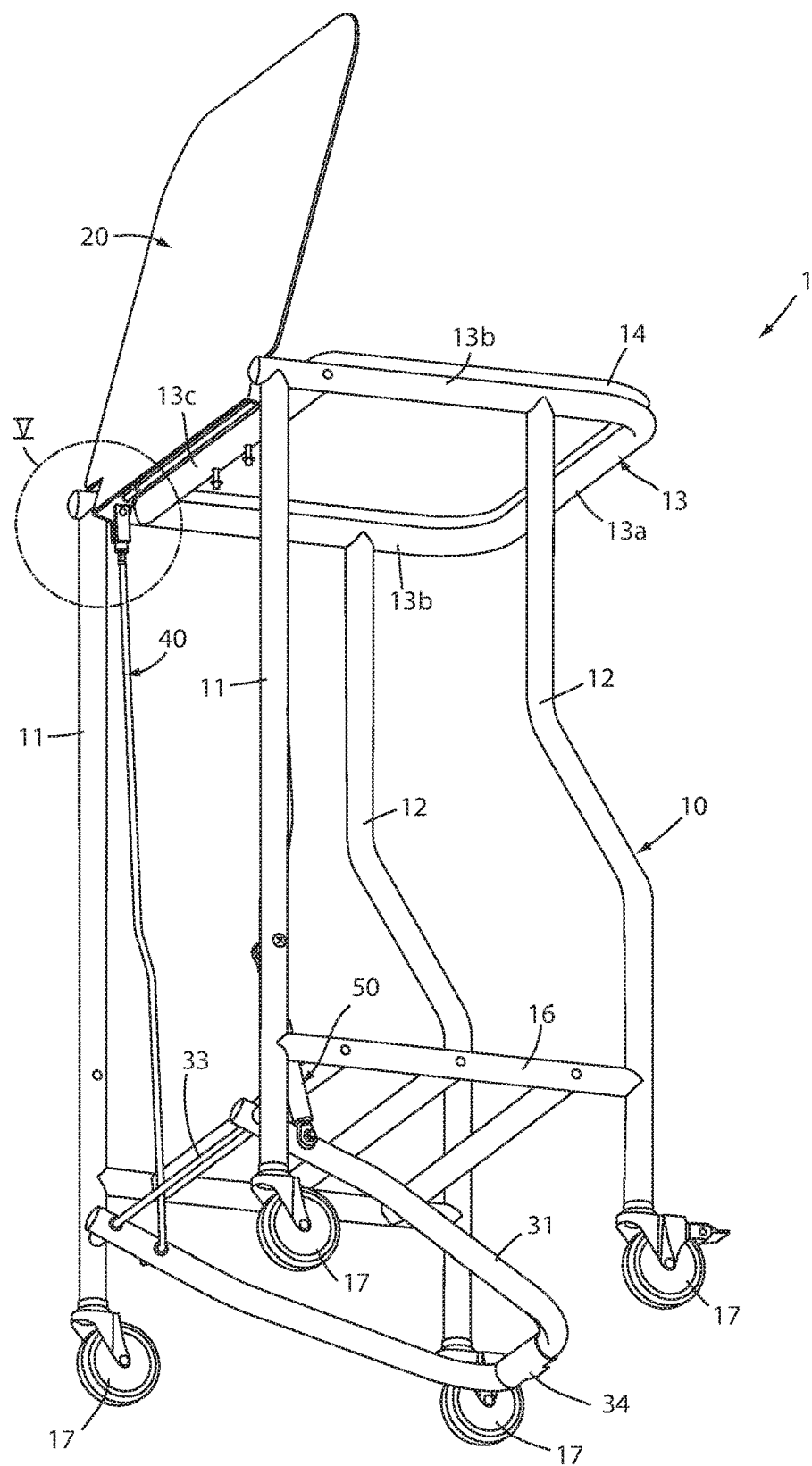
FIG. 4 is a slightly rear perspective view of the hamper frame with the lid open.
Figure 5:
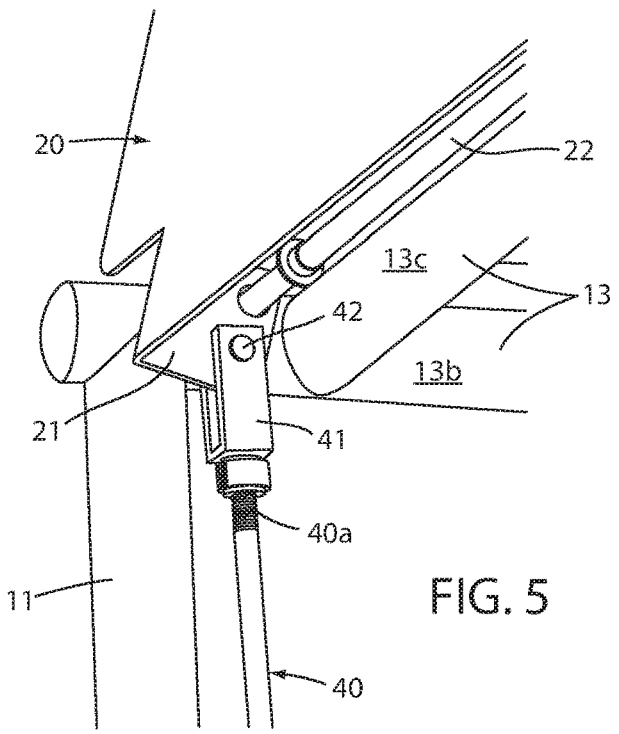
FIG. 5 is a perspective view of area V of FIG. 4.
Figure 6:
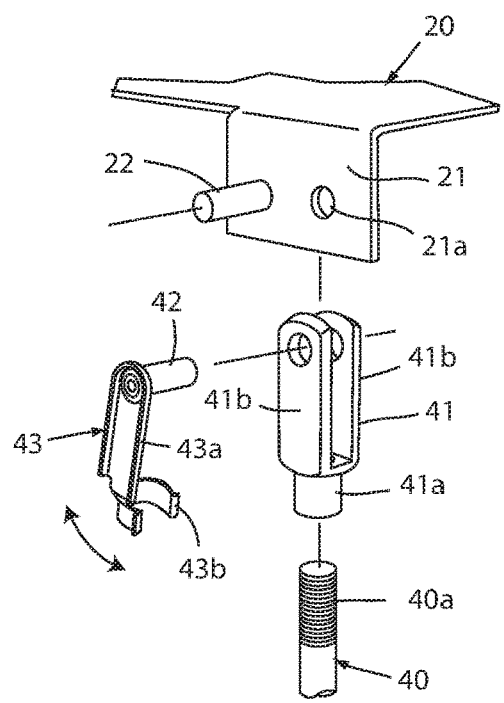
FIG. 6 is an exploded perspective view of the components shown in FIG. 5.

Frame 10 is a lightweight tubular frame, preferably made of aluminum tubing or other lightweight material (FIGS. 2-4). It comprises a pair of rear legs 11 and front legs 12, joined at their tops to a top opening frame 13. Top frame 13 comprises a front cross member 13a, rearwardly extending legs 13b, and a rear cross member 13c. The rearwardly extending legs 13b extend a short distance beyond rear cross member 13c.

Legs 11 and 12 are joined towards their bottom ends by a bottom bag support frame 16. Bottom bag support frame 16 not only provides structure for cart 1 through its connection to rear legs and front legs 11 and 12, but also provides a support for a hamper bag when it is removably hung on cart 1.

A hamper bag retainer frame 14 sits on the top of top frame 13. Frame 14 is pivotally mounted on a retainer frame pivot axle 15, which in turn is fastened loosely to top frame 13, such that bag retainer frame 14 can not only be pivoted upwardly, but also can be lifted somewhat along its rear, to facilitate mounting a hamper bag on cart 1. Casters 17 are secured in the bottom of tubular legs 11 and 12 such that hamper 1 can be conveniently moved about.

Hamper lid 20 includes a pair of side flanges 21 projecting downwardly from each side at the rear of lid 20 (FIGS. 5-7B). A lid pivot axle 22 passes through holes in side flanges 21 and into the opposite side tubular members 13b of top frame member 13. Pivot axle 22 is located just slightly above and to the rear of the rear cross member 13c of top frame 13. Lid 20 opens and closes by pivoting on pivot axle 22.

Foot pedal 30 preferably comprises a generally U-shaped tubular frame member having side legs 31 and a front cross member 32. A pedal axle 33 extends between rear legs 11 near the bottoms thereof. Axle 33 passes through the end portions of the side legs 31 of pedal 30 such that pedal 30 can be pivoted up and down on pivot axle 33. Pivot axle 33 is positioned slightly below bottom bag support frame 16, and the front of foot pedal 30 extends out beyond the front of bottom bag support frame 16 for easy access. The front cross member 32 of foot pedal 30 is covered by a rubber or plastic sleeve 34 which provides a protective cushion on which the user can place his or her foot to depress foot pedal 30.

Closing cylinder 50 is connected at one end to foot pedal 30 at a pivot point a few inches forward of foot pedal pivot axle 33. Control rod 40 is bent at its point of connection to foot pedal 30, whereby it includes an extension which passes through foot pedal leg 31. Cylinder 50 is pivotally connected to said extension of said control rod 41, thereby being pivotally connected to foot pedal 30. At its other end, closing cylinder 50 is connected to a rear leg 11 of frame 10. Closing cylinder 50 is biased to the closing position, and thus tends to pull foot pedal 30 upwardly when a user releases his or her foot from foot pedal 30.

Figure 7A:
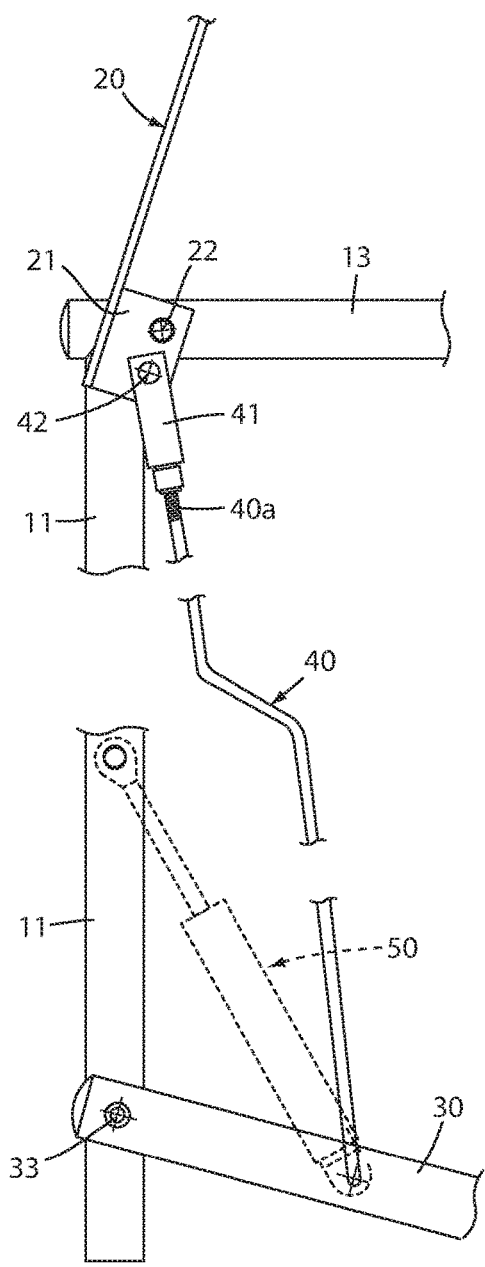
FIG. 7A is a fragmentary side elevational view showing the position of the lid relative to the hamper frame in one adjustment orientation of the control rod.
Figure 7B:
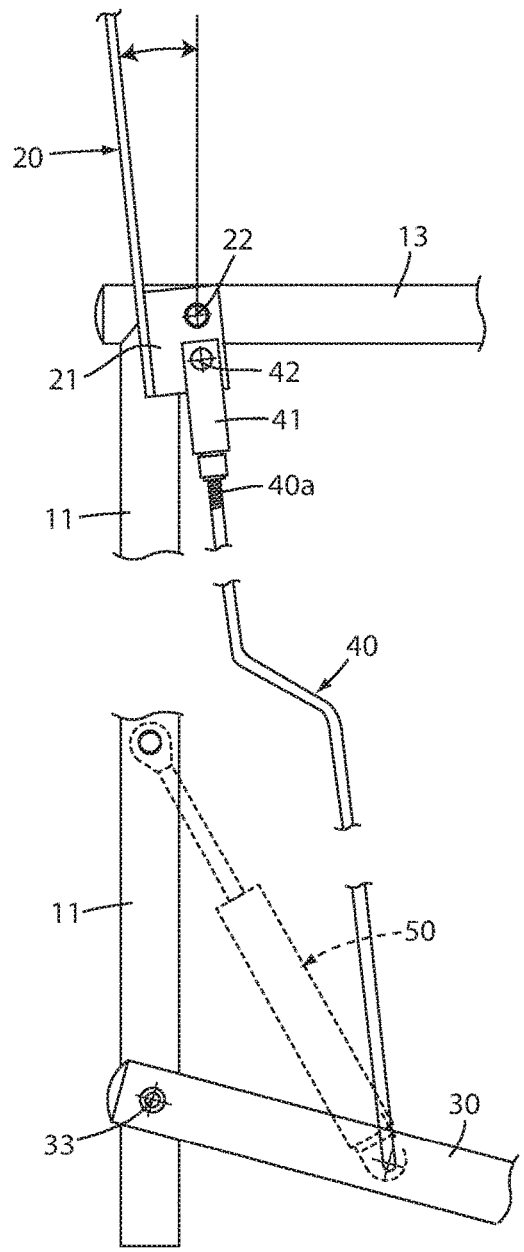
FIG. 7B is a side elevational fragmentary view showing the control rod adjusted to open the lid to the point at which the closing cylinder will not close the lid when the foot pedal is released.

Foot pedal 30 is connected to the side flanges 21 of lid 20 by two control rods 40, one on one side and one on the other side of foot pedal 30 and lid 20. Because of this connection, depression of foot pedal 30 tends to pull lid 20 open as shown in FIGS. 7A, 7B. Control rods 40 comprise an aluminum or steel rod, but also a connector 41 which pivotally connects the rods to their respective lid side flanges 21. (FIGS. 5-7B). Connector 41 has a threaded bottom sleeve 41a, and upwardly extending side legs 41b, each of which has an aperture near its upper end for receiving a connector pin 42. The threaded sleeve 41a is threaded onto the threaded end 40a of control rod 40. Connector 41 is positioned with its side legs 41b on either side of lid side flange 21, and the apertures in legs 41b are aligned with an aperture 21a in side flange 21 such that connector pin 42 can be inserted therethrough and thereby join connector 41 of control rod 40 to the side flange 21 of lid 20.

Connector pin 42 is held in place by a connector pin latch 43, which includes a leg 43a and a generally U-shaped clip 43b which clips over the outside of threaded sleeve 41a of connector 41, thereby holding pin 42 in place. If a user wants to adjust the length of control rod 40, he or she simply unclips connector pin latch 43, removes pin 42, and removes connector 41 from its embracing relationship with top side flange 21, thereby allowing the user to thread connector 41 upwardly or downwardly on the threaded end 40a of control rod 40. In this way, the user changes the length of control rod 40.

Control rod 40 is connected to its respective lid side flange 21 a short distance behind the pivot axle 22 for lid 20. In this manner, depression of foot pedal 30 pulls downwardly on the rear of side flange 21, causing lid 20 to pivot up on pivot axle 22 to an open position as shown for example in FIGS. 2, 4, 5, and 7A or 7B. Whether lid 20 is opened to a slightly forwardly inclined open position as shown in FIG. 7A, or to a slightly rearwardly inclined position as shown in FIG. 7B is a function of the length of the control rods 40. As shown in FIG. 7A, control rod 40 is said to be adjusted to its first state or condition. As shown in FIG. 7A, control rod 40 is said to be adjusted to its second state or condition.

By shortening the length of control rod 40 sufficiently, depression of foot pedal 30 will pull lid 20 open to a slightly rearwardly inclined position as shown in FIG. 7B. Because control rod 40 extends upwardly to its connection with said side flange 21 of lid 20 at a slight rearward angle to vertical, lid 21 is inclined rearwardly from vertical when it is opened with control rod 40 in its shorter state as shown in FIG. 7B. In this position, the pivot axle 22 for lid 20 and the connector pin 42 of control rod 40 are in alignment with, or possibly slightly over center relative to, a closing force exerted on control rod 40 by cylinder 50. As such, cylinder 50 will not be able to close the lid 20 when lid 20 is in the position shown in FIG. 7B. To close lid 20 from the position shown in FIG. 7B, the user must tap lid 20 in a forward direction, such that pivot 42 pin becomes located behind pivot axle 22 as shown in FIG. 7A, thus allowing cylinder 50 to pull foot pedal 30 upwardly and cause control rod 40 to push lid 20 closed.

Hamper bag 60 includes flaps 61 which can be passed between hamper retainer frame 14 and top frame 13 and wrapped around the respective sides of top frame 13 and secured by securement tabs 62 such that hamper 60 is held in position as shown in FIG. 3.

Thus, the preferred embodiment utility cart provides a very lightweight, mobile hamper having a lid 20 which can be opened by depressing foot pedal 30. The control rods 40 between foot pedal 30 and hamper lid 20 can be adjusted in length such that depression of foot pedal 30 opens the lid to the position shown in FIG. 7A, or to the position shown in FIG. 7B. In the former position, lid 20 will close slowly and quietly when the user removes his or her foot from foot pedal 30. In the position shown in FIG. 7B, lid 20 will not close when the user removes his or her foot from foot pedal 30, thereby allowing the user to continue loading or removing clothes from the clothes hamper bag 60 without having to retain his or her foot on foot pedal 30. When the user desires to close lid 20, he or she simply taps it in a forward direction and cylinder 50 will then slowly and quietly close lid 20 in the manner illustrated in FIG. 7A.

Of course, it is understood that the foregoing is a preferred embodiment of the invention and that various changes and alterations can be made without departing from the spirit of the invention as defined by the appended claims, interpreted in accordance with the principles of patent law.

The invention claimed is:

1. A hamper comprising:
    an open top and including a frame for supporting a hamper bag, said frame having a top and a bottom;
    a lid being pivotally connected near its rear at a first pivot point to said frame at the top of said frame and over said open top;
    said lid including a downwardly extending side flange on each side thereof and near the rear of said lid;
    a foot pedal pivotally connected to said frame toward the bottom thereof;
    a control rod pivotally connected to one of said side flanges, at a second pivot point located rearwardly of said first pivot point;
    said control rod being pivotally connected to said foot pedal at a point located ahead of the pivotal connection of said foot pedal to said frame, whereby depression of said foot pedal pulls said lid side flange downwardly, causing said lid to pivot open;
    said control rod being adjustable, whereby pressure on said foot pedal opens said lid;
    a closing cylinder operably connected to said lid, biased to slowly and quietly close said lid when pressure on said foot pedal is released;
    said control rod being adjustable between a first state in which said lid will close when pressure on said foot pedal is released, and a second state in which the length of said control rod is such that upon pivoting said lid to its open position, said first and second pivot points of said side flange are aligned or are over center with respect to the upward force exerted by said control rod on said side flange as said closing cylinder attempts to close said lid such that said lid will stay open when said pressure on said foot pedal is released, and will close when said lid is pushed slightly in a closing direction, allowing said closing cylinder to close said lid.

2. The hamper of claim 1 in which said control rod is adjustable between said first and second states by changing the length of said control rod.

3. The hamper of claim 1 in which said frame is a tubular frame.

4. The hamper of claim 1 in which said closing cylinder is operably connected to said lid by being pivotally mounted on one end to said frame, and at the other end to said foot pedal, at a point located forwardly of the pivotal connection of said foot pedal to said frame, whereby said cylinder tends to pull said foot pedal upwardly after pressure has been removed from said foot pedal, thus pushing said lid side flange up and pivoting said lid downwardly into its closed position.

5. The hamper of claim 4 in which said control rod extends upwardly to its connection with said side flange of said lid at rearward angle to vertical, such that when said control rod is in said second state, said lid is inclined rearwardly from vertical when it is open.

6. The hamper of claim 5 in which said foot pedal is a tubular generally "U" shaped member with a front cross portion for engagement with a user's foot, and two side legs extending rearwardly from said front cross portion; said side legs each being pivotally connected to said frame near the rear of said side leas.

7. The hamper of claim 6 in comprising: said tubular frame including a spaced pair of tubular front legs and a spaced pair of tubular rear legs, a top frame joining said legs and defining said open top; said top frame including a front cross member, rearwardly extending side members, and a rear cross member, said side members extending rearwardly past said rear cross member; said lid being pivotally mounted to said top frame side members, behind said rear cross member: each said rearwardly extending leg of said foot pedal being pivotally connected to an adjacent one of said rear legs, towards the bottom thereof; said closing cylinder being pivotally connected at one end to one of said rear legs of said frame, and extending forwardly and downwardly therefrom to a pivotal connection with one of said rearwardly extending legs of said foot pedal, at a point spaced forwardly of said pivotal connection of said foot pedal leg to said rear leg of said frame; said control rod being pivotally connected to said foot pedal at said point of connection of said cylinder to said foot pedal.

8. The hamper of claim 7 in which said control rod is bent at its point of connection to said foot pedal, whereby it includes an extension which passes through said foot pedal leg; said cylinder being pivotally connected to said extension of said control rod, thereby being pivotally connected to said foot pedal.

9. A hamper comprising:
an open top; a lid connected pivotally mounted over said open top; a foot pedal pivotally connected to said hamper;
a control rod connecting said foot pedal to said lid, whereby pressure on said foot pedal opens said lid;
a closing cylinder is operably connected to said lid and is biased to slowly and quietly close said lid when pressure on said foot pedal is released;
said control rod being adjustable in length between a first state in which the length of said control rod will allow said lid to close when pressure on said foot pedal is released, and a second state in which the length of said control rod is such that said lid will stay open when said pressure on said foot pedal is released, and will close when the lid is pushed slightly in a closing direction, allowing said closing cylinder; said control rod including a rod having a threaded end, and a connector having a threaded sleeve into which said threaded end of said rod is threadably received; the length of said control rod being adjustable by threading said threaded sleeve to either said first state length or said second state length.

10. The hamper of claim 9 in which said connector is releasably connected to said lid, facilitating threaded adjustment of said rod in said connector.

11. A hamper comprising:
an open top; a lid connected pivotally mounted over said open top; a foot pedal pivotally connected to said hamper;
a control rod connecting said foot pedal to said lid, whereby pressure on said foot pedal opens said lid,
a closing cylinder is operably connected to said lid, and is biased to slowly and quietly close said lid when pressure on said foot pedal is released;
said control rod being adjustable in length between a first state in which the length of said control rod will allow said lid to close when pressure on said foot pedal is released, and a second state in which the length of said control rod is such that said lid will stay open when said pressure on said foot pedal is released, and will close when the lid is pushed slightly in a closing direction, allowing said closing cylinder; said lid including a downwardly extending side flange on each side of said lid, located near the rear of said lid: said lid being pivotally mounted to said hamper at a first pivot point; said control rod being pivotally connected to one of said side flanges, at a second point located rearwardly of said first pivot point of said lid; said control rod being pivotally connected to said foot pedal at a point located ahead of the pivotal connection of said foot pedal said hamper, whereby depression of said foot pedal pulls said lid side flange downwardly, causing said lid to pivot open; the length of said control rod in said second state being such that upon pivoting said lid to its open position, said first and second pivot points of said side flange are aligned or are over center with respect to the upward force exerted by said control rod on said side flange as said closing cylinder attempts to close said lid.

12. The hamper of claim 11 in which said closing cylinder is operably connected to said lid by being pivotally mounted on one end to said hamper, and at the other end to said foot pedal, whereby said cylinder tends to pull said foot pedal upwardly after pressure has been removed from said foot pedal, thus pushing said lid side flange up and pivoting said lid downwardly into its closed position.

13. The hamper of claim 12 in which said control rod extends upwardly to its connection with said side flange of said lid at rearward angle to vertical, such that when said control rod is in said second state, said lid is inclined rearwardly from vertical when it is open.

* * * * *